United States Patent [19]
Arnold

[11] Patent Number: 6,047,448
[45] Date of Patent: Apr. 11, 2000

[54] BUNDLING STRAP SYSTEM

[76] Inventor: Phillip F. Arnold, 307 S. Maumee St., Tecumseh, Mich. 49286

[21] Appl. No.: 09/124,728

[22] Filed: Jul. 30, 1998

[51] Int. Cl.$^7$ ..................................................... B65B 27/06
[52] U.S. Cl. ...................................... 24/16 PB; 24/30.5 P
[58] Field of Search ............................... 24/16 R, 16 PB, 24/17 AD, 17 A, 30.5 P; 248/74.3

[56] References Cited

U.S. PATENT DOCUMENTS

| | | | |
|---|---|---|---|
| 3,192,584 | 7/1965 | Pape | 24/16 PB |
| 4,665,588 | 5/1987 | Nakano | 24/16 PB |
| 4,862,560 | 9/1989 | Lichtenberg | 24/16 PB |
| 4,882,813 | 11/1989 | Nakamura | 24/16 PB |
| 5,224,244 | 7/1993 | Ikeda et al. | 24/16 PB |
| 5,687,456 | 11/1997 | Chang | 24/16 PB |
| 5,915,629 | 6/1999 | Ribeiro | 24/16 PB |

*Primary Examiner*—James R. Brittain

[57] ABSTRACT

A new bundling strap system for providing a reusable strap for bundling items together. The inventive device includes an elongate flexible bundling strap and a fastening member. The bundling strap has a pair of opposite ends. A fastening member has opposite first and second ends. One of the ends of the bundling strap is insertable through one of the ends of the fastening member into the fastening member. Another of the ends of the bundling strap is insertable through another of the ends of the fastening member into the fastening member. The fastening member has first and second pawls. The first pawl engages the bundling strap to prevent pulling of the one end of the bundling strap out of the fastening member through the one end of the fastening member. The second pawl engages the bundling strap to prevent pulling of the other end of the bundling strap out of the fastening member through the other end of the fastening member.

12 Claims, 3 Drawing Sheets

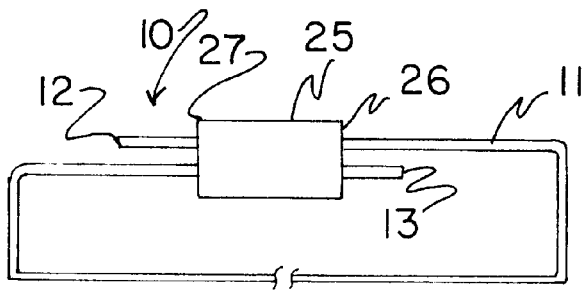
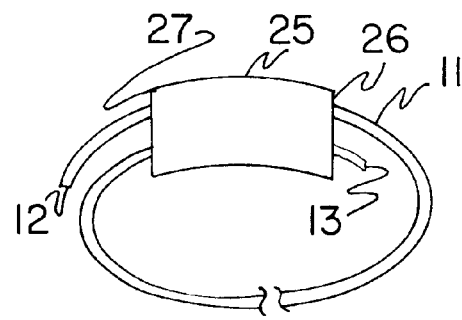
FIG. 1
FIG. 2
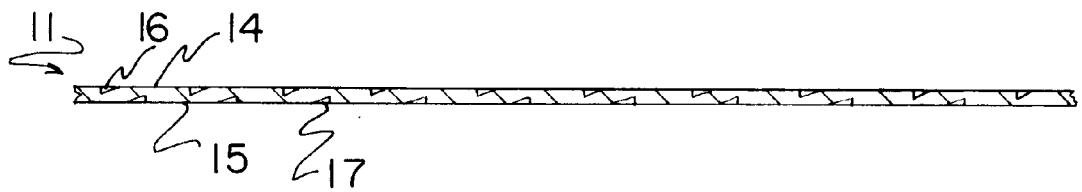
FIG. 3
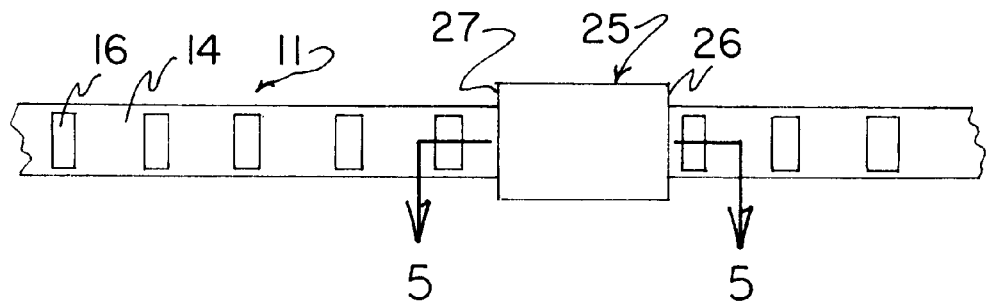
FIG. 4

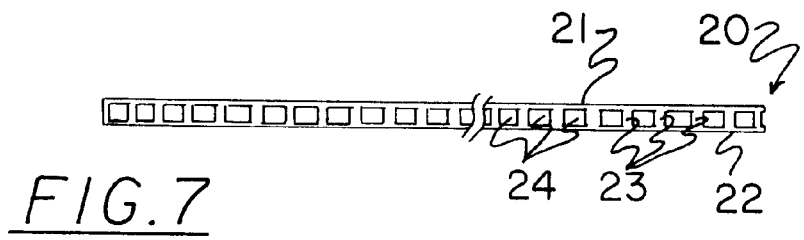
FIG. 7
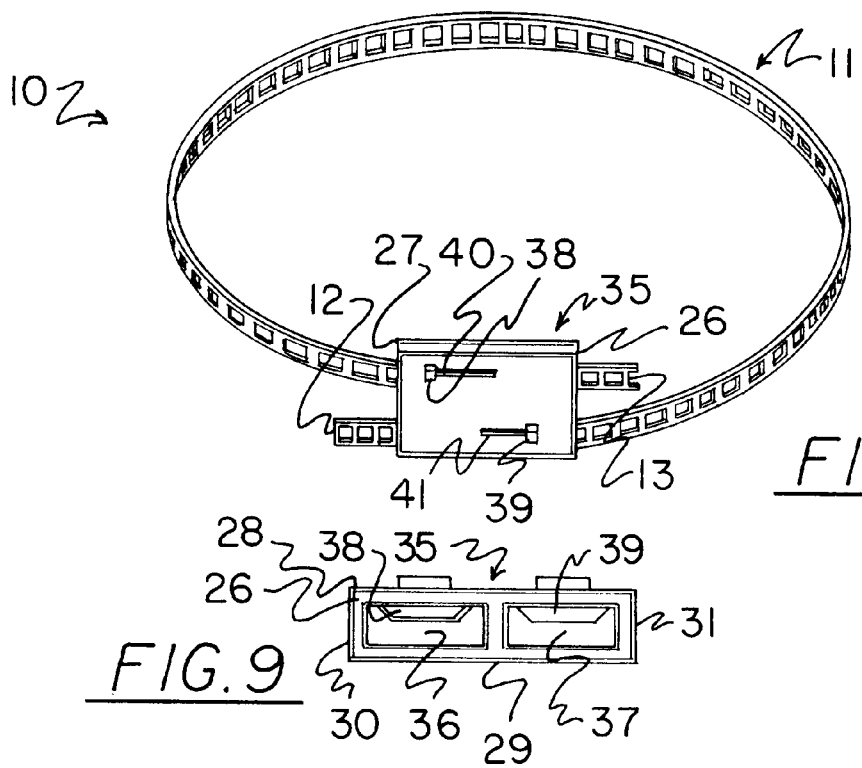
FIG. 8
FIG. 9
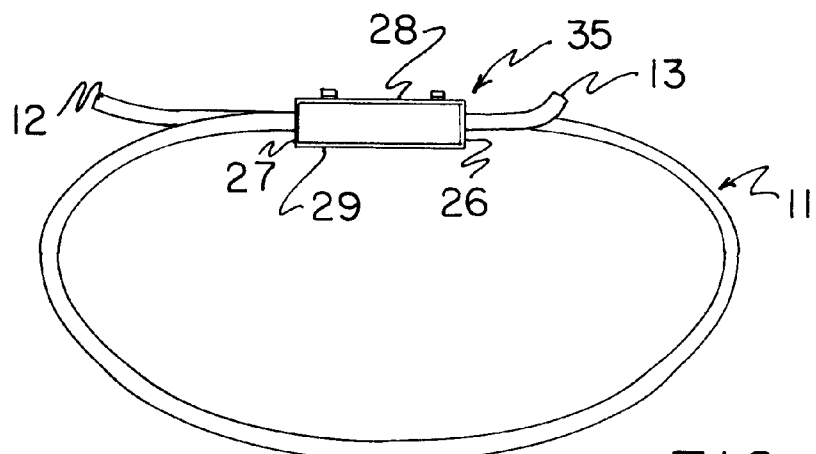
FIG. 10

BUNDLING STRAP SYSTEM

BACKGROUND OF THE INVENTION

1. Field of the Invention

The present invention relates to bundling straps and cable ties and more particularly pertains to a new bundling strap system for providing a reusable strap for bundling items together.

2. Description of the Prior Art

The use of bundling straps and cable ties is known in the prior art. More specifically, bundling straps and cable ties heretofore devised and utilized are known to consist basically of familiar, expected and obvious structural configurations, notwithstanding the myriad of designs encompassed by the crowded prior art which have been developed for the fulfillment of countless objectives and requirements.

Known prior art bundling straps and cable ties include U.S. Pat. Nos. 3,747,164; 5,537,719; 3,214,808; 3,197,829; U.S. Pat. No. Des. 256,438; and U.S. Pat. No. 3,186,047.

While these devices fulfill their respective, particular objectives and requirements, the aforementioned patents do not disclose a new bundling strap system. The inventive device includes an elongate flexible bundling strap and a fastening member. The bundling strap has a pair of opposite ends. A fastening member has opposite first and second ends. One of the ends of the bundling strap is insertable through one of the ends of the fastening member into the fastening member. Another of the ends of the bundling strap is insertable through another of the ends of the fastening member into the fastening member. The fastening member has first and second pawls. The first pawl engages the bundling strap to prevent pulling of the one end of the bundling strap out of the fastening member through the one end of the fastening member. The second pawl engages the bundling strap to prevent pulling of the other end of the bundling strap out of the fastening member through the other end of the fastening member.

In these respects, the bundling strap system according to the present invention substantially departs from the conventional concepts and designs of the prior art, and in so doing provides an apparatus primarily developed for the purpose of providing a reusable strap for bundling items together.

SUMMARY OF THE INVENTION

In view of the foregoing disadvantages inherent in the known types of bundling straps and cable ties now present in the prior art, the present invention provides a new bundling strap system construction wherein the same can be utilized for providing a reusable strap for bundling items together.

The general purpose of the present invention, which will be described subsequently in greater detail, is to provide a new bundling strap system apparatus and method which has many of the advantages of the bundling straps and cable ties mentioned heretofore and many novel features that result in a new bundling strap system which is not anticipated, rendered obvious, suggested, or even implied by any of the prior art bundling straps and cable ties, either alone or in any combination thereof.

To attain this, the present invention generally comprises an elongate flexible bundling strap and a fastening member. The bundling strap has a pair of opposite ends. A fastening member has opposite first and second ends. One of the ends of the bundling strap is insertable through one of the ends of the fastening member into the fastening member. Another of the ends of the bundling strap is insertable through another of the ends of the fastening member into the fastening member. The fastening member has first and second pawls. The first pawl engages the bundling strap to prevent pulling of the one end of the bundling strap out of the fastening member through the one end of the fastening member. The second pawl engages the bundling strap to prevent pulling of the other end of the bundling strap out of the fastening member through the other end of the fastening member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bundling strap system apparatus and method which has many of the advantages of the bundling straps and cable ties mentioned heretofore and many novel features that result in a new bundling strap system which is not anticipated, rendered obvious, suggested, or even implied by any of the prior art bundling straps and cable ties, either alone or in any combination thereof.

It is another object of the present invention to provide a new bundling strap system which may be easily and efficiently manufactured and marketed.

It is a further object of the present invention to provide a new bundling strap system which is of a durable and reliable construction.

An even further object of the present invention is to provide a new bundling strap system which is susceptible of a low cost of manufacture with regard to both materials and labor, and which accordingly is then susceptible of low prices of sale to the consuming public, thereby making such bundling strap system economically available to the buying public.

Still yet another object of the present invention is to provide a new bundling strap system which provides in the apparatuses and methods of the prior art some of the advantages thereof, while simultaneously overcoming some of the disadvantages normally associated therewith.

Still another object of the present invention is to provide a new bundling strap system for providing a reusable strap for bundling items together.

Yet another object of the present invention is to provide a new bundling strap system which includes an elongate flexible bundling strap and a fastening member. The bundling strap has a pair of opposite ends. A fastening member has opposite first and second ends. One of the ends of the bundling strap is insertable through one of the ends of the fastening member into the fastening member. Another of the ends of the bundling strap is insertable through another of the ends of the fastening member into the fastening member. The fastening member has first and second pawls. The first pawl engages the bundling strap to prevent pulling of the one end of the bundling strap out of the fastening member through the one end of the fastening member. The second pawl engages the bundling strap to prevent pulling of the other end of the bundling strap out of the fastening member through the other end of the fastening member.

Still yet another object of the present invention is to provide a new bundling strap system that allows a user to use any sufficient length of bundling strap around items to hold the items together.

Even still another object of the present invention is to provide a new bundling strap system that is reusable so that the bundling strap may be used over and over.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new bundling strap system according to the present invention with the bundling strap being bent into a loop.

FIG. 2 is a schematic side view of the present invention with the bundling strap being curved into a loop.

FIG. 3 is a schematic cross sectional view of a preferred embodiment of the bundling strap of the present invention.

FIG. 4 is another schematic side view of the preferred embodiment of the present invention.

FIG. 7 is a schematic side view of another preferred embodiment of the bundling strap of the present invention.

FIG. 8 is a schematic perspective view of the flattened fastening member embodiment of the present invention.

FIG. 9 is a schematic end view of the flattened fastening member embodiment of the present invention.

FIG. 10 is a schematic side view of the flattened fastening member embodiment of the present invention.

DESCRIPTION OF THE PREFERRED EMBODIMENT

Figure 5:
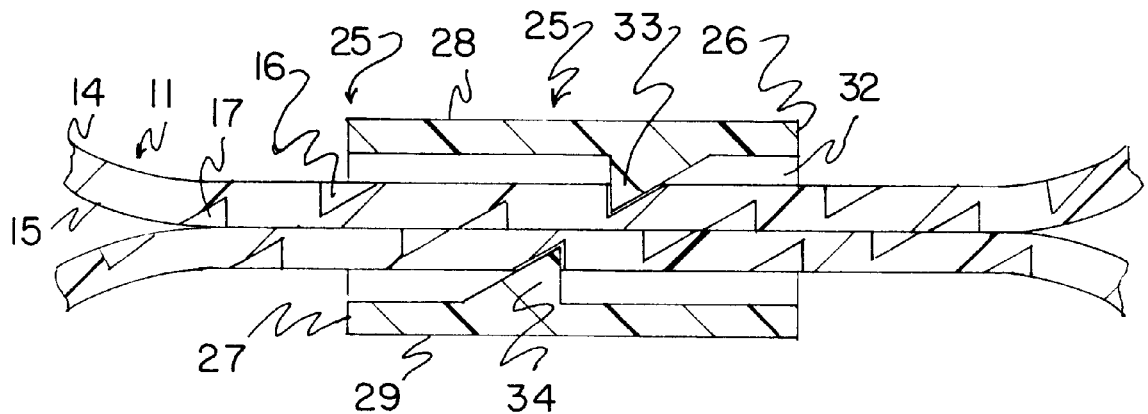
FIG. 5 is a schematic cross sectional view of the fastening member of the present invention taken from line 5—5 of FIG. 4.
Figure 6:
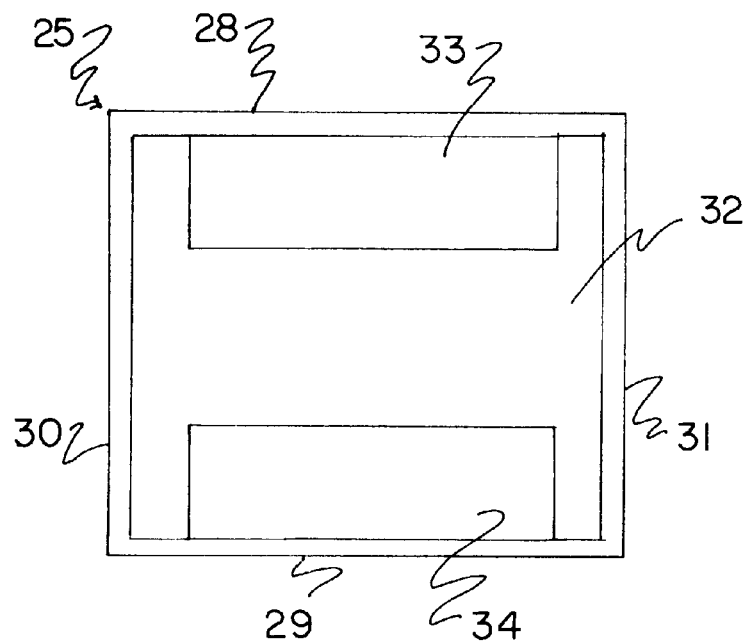
FIG. 6 is a schematic end view of the fastening member of the present invention.

With reference now to the drawings, and in particular to FIGS. 1 through 10 thereof, a new bundling strap system embodying the principles and concepts of the present invention and generally designated by the reference numeral 10 will be described.

In use the bundling strap system 10 is designed for looping around items to bundle the items together. As best illustrated in FIGS. 1 through 10, the bundling strap system 10 generally comprises an elongate flexible bundling strap 11 and a fastening member 25. The bundling strap 11 has a pair of opposite ends 12,13. A fastening member 25 has opposite first and second ends 26,27. One of the ends 12 of the bundling strap 11 is insertable through one of the ends 26 of the fastening member 25 into the fastening member 25. Another of the ends 13 of the bundling strap 11 is insertable through another of the ends 27 of the fastening member 25 into the fastening member 25. The fastening member 25 has first and second pawls 33,34. The first pawl 34 engages the bundling strap 11 to prevent pulling of the one end 12 of the bundling strap 11 out of the fastening member 25 through the one end 26 of the fastening member 25. The second pawl 35 engages the bundling strap 11 to prevent pulling of the other end 13 of the bundling strap 11 out of the fastening member 25 through the other end 27 of the fastening member 25.

Specifically, the elongate flexible bundling strap 11 has opposite first and second faces 14,15, a pair of opposite ends 12,13, and a length extending between the ends 12,13 of the bundling strap 11. The bundling strap 11 is sufficiently flexible to permit looping of the length of the bundling strap 11 around items to be bundled together by both curving of the bundling strap 11 (as illustrated in FIG. 2) and bending of the bundling strap 11 (as illustrated in FIG. 1). In a first preferred embodiment, each of the faces 14,15 of the bundling strap 11 has a row of spaced apart apertures 16,17 therein. The row of apertures of the faces of the bundling strap are extended along the length of the bundling strap between the ends 12,13 of the bundling strap 11. Preferably, the apertures 16 of the first face 14 of the bundling strap are positioned along the length of the bundling strap 11 in an alternating sequence with the apertures 17 of the second face 15 of the bundling strap such that the apertures of each face are staggered in position with respect to the adjacent apertures on the other face. Each of the apertures 16,17 of the first and second faces 14,15 of the bundling strap has a generally rectangular opening therein providing on the respective face of the bundling strap and has generally triangular depth taken from a cross section extending between the first and second faces of the bundling strap along the length of the bundling strap.

In another preferred embodiment as illustrated in FIG. 7, the bundling strap 20 has an elongate row of spaced apart apertures 24 therethrough between the first and second faces of the bundling strap. Each of the apertures of the bundling strap has a generally rectangular periphery has a pair of parallel sides and ends. The sides of the apertures are extended between the sides of the bundling strap and are generally parallel with the sides of the other of the apertures. Preferably, this embodiment of the bundling strap 20 comprises a pair of spaced apart elongate side rails 21,22 and a plurality of spaced apart cross rails 23 extending between the side rails. The cross rails are arranged in a row extending between the ends of the banding member so that each adjacent pair of cross rails defines one of the apertures 24 through the banding member 20.

The fastening member 25 is generally rectangular and has opposite first and second ends 26,27, and first and second pairs of opposite sides 28,29,30,31. Each of the ends and sides of the fastening member 25 is generally rectangular and generally planar. The ends 26,27 of the fastening member 25 are generally parallel to each other. The sides of the first pair of sides 28,29 of the fastening member 25 are generally parallel with each other and the sides of the second pair of sides 30,31 of the fastening member 25 are generally parallel with each other. The ends 26,27 of the fastening member 25 are generally perpendicular to the sides 28,29, 30,31 of the fastening member 25 while the sides of the first pair of sides 28,29 of the fastening member 25 are generally perpendicular to the sides of the second pair of sides 30,31 of the fastening member 25. The fastening member 25 has a length defined between the ends of the fastening member 25, a thickness defined between the first pair of sides 28,29 of the fastening member 25, and a width defined between the second pair of sides 30,31 of the fastening member 25.

In a preferred embodiment, the fastening member 25 has a bore 32 therethrough extending between the ends of the fastening member 25. The bore 32 has a generally rectangular cross section taken generally perpendicular to the length of the fastening member 25 such that the bore has first and second pair of opposite side walls. Each of the side walls of the first pair of side walls of the bore is positioned adjacent an associated side of the first pair of sides 28,29 of the fastening member 25. Each of the side walls of the second pair of side walls of the bore is positioned adjacent an associated side of the second pair of sides 30,31 of the fastening member 25. In this embodiment, the fastening member 25 has first and second pawls 33,34 extending into the bore 32 of the fastening member 25. The first pawl 33 is extended from one of the side walls of the first pair of side walls of the bore towards another of the side walls of the first pair of side walls while the second pawl 34 is extended from another the other of the side walls of the first pair of side walls of the bore towards the one of the side walls of the bore. Ideally, each of the pawls 33,34 has a generally triangular cross section.

In use, the ends 12,13 of the bundling strap 11 is insertable through the bore 32 of the fastening member 25 so that the ends of the bundling strap can be secured together after being looped around items being bundled by the bundling strap. One of the ends of the bundling strap is inserted into the bore 32 of the fastening member from one of the ends of the fastening member such that one of the faces of the bundling strap is positioned adjacent one of the side walls of the first pair of side walls of the bore. The first pawl 33 is insertable into one of the apertures of the adjacent face of the bundling strap such that the first pawl 33 engages the bundling strap. This way, the first pawl 33 prevents pulling of the one end of the bundling strap out of the bore of the fastening member through the one end of the fastening member. Similarly, another of the ends of the bundling strap is inserted into the bore of the fastening member from another of the ends of the fastening member such that one of the faces of the bundling strap is positioned adjacent another of the side walls of the first pair of side walls of the bore. The second pawl 34 is insertable into one of the apertures of the adjacent face of the bundling strap such that the second pawl 34 engages the bundling strap to prevent pulling of the another end of the bundling strap out of the bore of the fastening member 25 through the another end of the fastening member 25.

With reference to FIGS. 8, 9, and 10, in another preferred embodiment, where the thickness of the fastening member is crucial and must be as flat as possible, the fastening member 35 has first and second bores 36,37 therethrough extending between the ends of the fastening member 35. Each of the bores 36,37 has a generally rectangular cross section taken generally perpendicular to the length of the fastening member. The first and second bores 36,37 of the fastening member are arranged in a row extending between the second pair of sides of the fastening member. The first and second bores of the fastening member are generally coplanar with each other such that the plane the first and second bores of the fastening member lie in is generally parallel with the sides of the first pair of sides of the fastening member. In this embodiment, the fastening member 35 has a first pawl 38 extending into the first bore of the fastening member and a second pawl 39 extending into the second bore of the fastening member. In use, the ends of the bundling strap are insertable through either of the bores of the fastening member with one of the ends of the bundling strap inserted into the first bore 36 of the fastening member from one of the ends of the fastening member and the other end of the bundling strap inserted into the second bore of the fastening member from another the other end\the fastening member. The first pawl 36 is insertable into one of the apertures of the adjacent face of the bundling strap such that the first pawl engages the bundling strap to prevent pulling of the one end of the bundling strap out of the first bore of the fastening member through the one end of the fastening member. The second pawl 39 is insertable into one of the apertures of the adjacent face of the bundling strap such that the second pawl engages the bundling strap to prevent pulling of the other end of the bundling strap out of the second bore of the fastening member through the other end of the fastening member.

In use, to release the ends of the bundling strap from the fastening member, the bundling strap is cut at a point between the ends of the bundling strap and the ends of the bundling strap are pulled through the fastening member in the direction that the associated pawl permits pulling through. Optionally in a releasable pawl embodiment of the fastening member, each of the pawls of the fastening member is retractable from the bore or associated bore such as by pulling on a flap 40,41 of the fastening member that the pawl is attached to such that each pawl is removable from insertion into an aperture of the bundling strap. This permits pulling out of associated end of the bundling through the end of the fastening member the end of the bundling strap was first inserted into the bore of the fastening member.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bundling strap system, comprising:

an elongate flexible bundling strap having opposite first and second faces, a pair of opposite ends, and a length extending between said ends of said bundling strap;

a fastening member having opposite first and second ends;

one of said ends of said bundling strap being insertable through one of said ends of said fastening member into said fastening member, another of said ends of said bundling strap being insertable through another of said ends of said fastening member into said fastening member; and said fastening member having a length defined between said ends of said fastening member;

said fastening member having first and second pawls, said first pawl engaging said bundling strap such that said first pawl prevents pulling of said one end of said bundling strap out of said fastening member through said one end of said fastening member, said second pawl engaging said bundling strap such that said second pawl prevents pulling of said another end of said bundling strap out of said fastening member through said another end of said fastening member;

wherein said fastening member has a bore therethrough extending between said ends of said fastening member, said first pawl being extended into said bore from one of said sides of said first pair of side of said fastening member, said second pawl being extended into said bore from another of said sides of said first pair of sides of said fastening member;

wherein each of said faces of said bundling strap has a row of spaced apart recesses therein, said row of recesses of said faces of said bundling strap being extended along said length of said bundling strap between said ends of said bundling strap, said bundling strap having spaced side edges and being continuous without perforations between said side edges for enhancing the strength of the bundling strap in a longitudinal direction, each of said recesses defining a cavity that does not extend from one of said faces to the other of said faces; and wherein one of said ends of said bundling strap is insertable into said bore of said fastening member from one of said ends of said fastening member with said first pawl being interlockable with one of said recesses of the adjacent face of said bundling strap and another of said ends of said bundling strap is insertable into said bore of said fastening member from another of said ends of said fastening member with said second pawl being interlockable with one of said recesses of the adjacent face of said bundling strap.

2. The bundling strap system of claim 1, wherein said fastening member is arcuate between said opposite ends with each of said faces being arcuate and substantially parallel between said ends such that one of said faces may be snugly abutted against an object having a curved surface.

3. The bundling strap system of claim 1, wherein said recesses of said first face of said bundling strap are positioned along said length of said bundling strap in an alternating sequence with said apertures of said second face of said bundling strap.

4. The bundling strap system of claim 1, wherein each of said recesses of said first and second faces of said bundling strap has a generally rectangular opening therein provided on the respective face of said bundling strap, and wherein each of the cavities formed by said recesses has a generally triangular cross section with a blocking wall oriented perpendicular to the respective face and having an interior end, and a sliding wall extending between the interior end of the blocking wall and the respective face such that one of said pawls engaging said recess slides along said sliding wall and lodges against said blocking wall to resist movement of the bundling strap relative to said fastening member in one direction.

5. The bundling strap system of claim 1, wherein each of said recesses of said bundling strap has a generally rectangular periphery.

6. The bundling strap system of claim 1, wherein said fastening member has first and second pairs of opposite sides, said fastening member having a length defined between said ends of said fastening member, said fastening member having a thickness defined between said first pair of sides of said fastening member, and said fastening member having a width defined between said second pair of sides of said fastening member.

7. The bundling strap system of claim 6, wherein said fastening member has first and second bores therethrough extending between said ends of said fastening member, each of said bore having a generally rectangular cross section, said first and second bores of said fastening member being arranged in a row extending between said second pair of sides of said fastening member, said first and second bores of said fastening member being generally coplanar with each other such that the plane said first and second bores of said fastening member lie in is generally parallel with said sides of said first pair of sides of said fastening member.

8. The bundling strap system of claim 7, wherein said first pawl extends into said first bore of said fastening member, and wherein said second pawl extends into said second bore of said fastening member.

9. The bundling strap system of claim 8, wherein said first pawl is insertable into one of said apertures of the adjacent face of said bundling strap, said first pawl preventing pulling of said one end of said bundling strap out of said first bore of said fastening member through said one end of said fastening member, and wherein said second pawl is insertable into one of said apertures of the adjacent face of said bundling strap, said second pawl preventing pulling of said another end of said bundling strap out of said second bore of said fastening member through said another end of said fastening member.

10. The bundling strap system of claim 9, wherein each of said pawls of said fastening member is retractable from the bore or associated bore such that each pawl is removable from insertion into one of said apertures of said bundling strap so that the associated end of the bundling strap is removable from said bore of said fastening member by pulling out through the end of the fastening member said end of said bundling strap was first inserted into the bore of the fastening member.

11. A bundling strap system, comprising:

an elongate flexible bundling strap having opposite first and second faces, a pair of opposite ends, and a length extending between said ends of said bundling strap;

each of said faces of said bundling strap having a row of spaced apart recesses therein, said row of recesses of said faces of said faces of said bundling strap being extended along said length of said bundling strap between said ends of said bundling strap, said recesses of said first face of said bundling strap being positioned along said length of said bundling strap in an alternating sequence with said apertures of said second face of said bundling strap;

each of said recesses of said first and second faces of said bundling strap having a generally rectangular opening therein providing on the respective face of said bundling strap;

a fastening member being generally rectangular and having opposite first and second ends, and first and second pairs of opposite sides, each of said ends and sides of said fastening member being generally rectangular and generally planar, said ends of said fastening member being generally parallel to each other, said sides of said first pair of sides of said fastening member being generally parallel with each other, said sides of said second pair of sides of said fastening member being generally parallel with each other, said ends of said fastening member being generally perpendicular to said sides of said fastening member, said sides of said first pair of sides of said fastening member being generally perpendicular to said sides of said second pair of sides of said fastening member;

said fastening member having a length defined between said ends of said fastening member, said fastening member having a thickness defined between said first pair of sides of said fastening member, and said fastening member having a width defined between said second pair of sides of said fastening member, wherein said fastening member is arcuate between said opposite ends with each of said faces being arcuate and substantially parallel between said ends such that one of said faces may be snugly abutted against an object having a curved surface;

said fastening member having a bore therethrough extending between said ends of said fastening member, said bore having a generally rectangular cross section such that said bore has first and second pair of opposite side walls;

each of said side walls of said first pair of side walls of said bore being positioned adjacent an associated side of said first pair of sides of said fastening member, each of said side walls of said second pair of side walls of said bore being positioned adjacent an associated side of said second pair of sides of said fastening member;

said fastening member having first and second pawls extending into said bore of said fastening member, said first pawl being extended from one of said side walls of said first pair of side walls of said bore, said second pawl being extended from another of said side walls of said first pair of side walls of said bore;

wherein each of said pawls has a generally triangular cross section;

wherein said fastening member has a bore therethrough extending between said ends of said fastening member, said first pawl being extended into said bore from one of said sides of said first pair of side of said fastening member, said second pawl being extended into said bore from another of said sides of said first pair of sides fastening member;

wherein each of said faces of said bundling strap has a row of spaced apart recesses therein, said row of recesses of said faces of said bundling strap being extended along said length of said bundling strap between said ends of said bundling strap, said bundling strap having spaced side edges and being continuous between said side edges for enhancing the strength of the bundling strap in a longitudinal direction, each of said recesses defining a cavity that does not extend from one said face to the other said face;

wherein one of said ends of said bundling strap is insertable into said bore of said fastening member from one of said ends of said fastening member with said first pawl being interlockable with one of said recesses of the adjacent face of said bundling strap and another of said ends of said bundling strap is insertable into said bore of said fastening member from another of said ends of said fastening member with said second pawl being interlockable with one of said recesses of the adjacent face of said bundling strap;

wherein each of the cavities formed by said recesses comprises a blocking wall oriented perpendicular to the respective face and having an interior end, and a sliding wall extending between the interior end of the blocking wall and the respective face such that one of said pawls engaging said recess slides along said sliding wall and lodges against said blocking wall to resist movement of the bundling strap relative to said fastening member in one direction.

12. A bundling strap system, comprising:

an elongate flexible bundling strap having opposite first and second faces, a pair of opposite ends, and a length extending between said ends of said bundling strap, said bundling strap having a pair of lateral side edges;

each of said faces of said bundling strap having a row of spaced apart apertures therein, said row of apertures of said faces of said bundling strap being extended along said length of said bundling strap between said ends of said bundling strap, said apertures of said first face of said bundling strap being positioned along said length of said bundling strap in an alternating sequence with said apertures of said second face of said bundling strap;

each of said apertures of said first and second faces of said bundling strap having a generally rectangular opening therein providing on the respective face of said bundling strap, wherein each of said apertures of said faces of said bundling strap has generally triangular cross section;

a fastening member being generally rectangular and having opposite first and second ends, and first and second pairs of opposite sides, each of said ends and sides of said fastening member being generally rectangular and generally planar, said ends of said fastening member being generally parallel to each other, said sides of said first pair of sides of said fastening member being generally parallel with each other, said sides of said second pair of sides of said fastening member being generally parallel with each other, said ends of said fastening member being generally perpendicular to said sides of said fastening member, said sides of said first pair of sides of said fastening member being generally perpendicular to said sides of said second pair of sides of said fastening member;

said fastening member having a length defined between said ends of said fastening member, said fastening member having a thickness defined between said first pair of sides of said fastening member, and said fastening member having a width defined between said second pair of sides of said fastening member;

said fastening member having first and second bores therethrough extending between said ends of said fastening member, each of said bore having a generally rectangular cross section;

said first and second bores of said fastening member being arranged in a row extending between said second pair of sides of said fastening member, said first and second bores of said fastening member being generally coplanar with each other such that the plane that said first and second bores of said fastening member lie in is generally parallel with said sides of said first pair of sides of said fastening member, whereby insertion of a first end portion of the bundling strap into said first bore and a second end portion of the bundling strap into said second bore positions one of the side edges of the first end portion adjacent to one of the side edges of the second end portion with the first and second end portions being generally coplanar;

said fastening member having a first pawl extending into said first bore of said fastening member, said fastening member having a second pawl extending into said second bore of said fastening member;

wherein each of said pawls has a generally triangular cross section;

one of said ends of said bundling strap being inserted into said first bore of said fastening member from one of said ends of said fastening member, said first pawl being insertable into one of said apertures of the adjacent face of said bundling strap, said first pawl preventing pulling of said one end of said bundling strap out of said first bore of said fastening member through said one end of said fastening member;

another of said ends of said bundling strap being inserted into said second bore of said fastening member from another of said ends of said fastening member, said second pawl being insertable into one of said apertures of the adjacent face of said bundling strap said second pawl preventing pulling of said another end of said bundling strap out of said second bore of said fastening member through said another end of said fastening member; and wherein a tab is coupled to each of said pawls of said fastening member for retracting said pawl from said associated bore, each pawl being removable from insertion into said aperture of said strap by the associated end of said strap being removed from said associated bore of said fastening member by pulling said strap out through said end of said fastening member.

* * * * *